(12) United States Patent
Yamaoka et al.

(10) Patent No.: US 7,732,950 B2
(45) Date of Patent: Jun. 8, 2010

(54) LINEAR OR CURVED MOBILE MOTOR AND ITS RADIATOR

(75) Inventors: Tatsuya Yamaoka, Kanagawa (JP);
Kazuyoshi Suzuki, Kanagawa (JP)

(73) Assignee: TS Heatronics Co., Ltd., Kanagawa (JP)

( * ) Notice: Subject to any disclaimer, the term of this patent is extended or adjusted under 35 U.S.C. 154(b) by 0 days.

(21) Appl. No.: 11/572,676

(22) PCT Filed: Jul. 25, 2005

(86) PCT No.: PCT/JP2005/013994

§ 371 (c)(1),
(2), (4) Date: Jun. 13, 2007

(87) PCT Pub. No.: WO2006/011614

PCT Pub. Date: Feb. 2, 2006

(65) Prior Publication Data

US 2008/0030081 A1    Feb. 7, 2008

(30) Foreign Application Priority Data

Jul. 25, 2004    (JP)    ............................. 2004-241694

(51) Int. Cl.
*H02K 41/00*    (2006.01)
*H02K 9/00*    (2006.01)

(52) U.S. Cl. .................... 310/12.01; 310/13; 310/14; 310/15; 310/16; 310/52; 310/54; 310/58; 310/59; 310/62; 310/63; 310/64; 165/150; 165/152; 165/170

(58) Field of Classification Search .................. 310/12, 310/13, 14, 15, 16, 52–63, 64; 165/150, 165/152, 170; *H02K 9/00, 41/00*
See application file for complete search history.

(56) References Cited

U.S. PATENT DOCUMENTS 3,801,843 A * 4/1974 Corman et al. ................ 310/52

(Continued)

FOREIGN PATENT DOCUMENTS

JP    4-183258 A    6/1992

(Continued)

*Primary Examiner*—Quyen Leung
*Assistant Examiner*—John K Kim
(74) *Attorney, Agent, or Firm*—Panitch Schwarze Belisario & Nadel LLP

(57) ABSTRACT

A radiator for a linear or curved mobile motor for removing the thermal distortion of a mover and a transporting member of a linear or curved mobile motor, and a high-accuracy, high-reliability linear or curved mobile motor using it. The linear or curved mobile motor includes a field pole having a plurality of permanent magnets with different magnetic poles arranged alternately along a field yoke, and an armature arranged opposite to the field pole via a magnetic gap and formed by winding a single or a plurality of coils around a core. The field pole is used as a stator and the armature being used as a mover that is relatively moved along the longitudinal direction of the stator. A thin plate heat pipe having therein thin holes for passing a hydraulic fluid is bright in close contact with the coil surface of the mover in parallel to a surface facing via a magnetic gap to constitute a heat absorbing unit and an end or part of the thin plate heat pipe is allowed to project from the magnetic gap to constitute a heat radiating unit.

16 Claims, 4 Drawing Sheets

U.S. PATENT DOCUMENTS

| | | | |
|---|---|---|---|
| 5,642,013 A * | 6/1997 | Wavre | 310/216.112 |
| 5,910,691 A * | 6/1999 | Wavre | 310/12.18 |
| 6,300,691 B1 * | 10/2001 | Hwang et al. | 310/12.29 |
| 6,313,552 B1 * | 11/2001 | Boast | 310/14 |
| 6,339,269 B1 * | 1/2002 | Hsiao | 310/64 |
| 6,528,907 B2 * | 3/2003 | Hwang et al. | 310/12.29 |
| 6,819,016 B2 * | 11/2004 | Houle et al. | 310/52 |
| 6,975,051 B2 * | 12/2005 | Groening et al. | 310/58 |
| 2001/0035686 A1 * | 11/2001 | Hwang et al. | 310/12 |
| 2004/0070288 A1 * | 4/2004 | Seki et al. | 310/12 |
| 2007/0062677 A1 * | 3/2007 | Usui et al. | 165/150 |
| 2008/0149303 A1 * | 6/2008 | Chang et al. | 165/80.2 |

FOREIGN PATENT DOCUMENTS

| | | |
|---|---|---|
| JP | 2000-333438 A | 11/2000 |
| JP | 2000-3411911 A | 12/2000 |
| JP | 2002-010618 A | 1/2002 |
| JP | 2002-238238 A | 8/2002 |
| JP | 2003-309963 A | 10/2003 |
| WO | 02/063749 A1 | 8/2002 |

\* cited by examiner

Prior Art

LINEAR OR CURVED MOBILE MOTOR AND ITS RADIATOR

CROSS-REFERENCE TO RELATED APPLICATION

This application is a section 371 of International Application No. PCT/JP2005/013994, filed Jul. 25, 2005, which was published in the Japanese language on Feb. 2, 2006, under International Publication No. WO 2006/011614 A1 and the disclosure of which is incorporated herein by reference.

TECHNICAL FIELD

The present invention relates to a linear or curved mobile motor that is adapted such that a field pole as a stator to be used for carrying of a machine tool or a semiconductor manufacturing apparatus and an armature as a mover move relative to each other, and its heat radiating structure of the mover.

BACKGROUND ART

Conventionally, as a linear mobile motor that is adapted such that a field pole as a stator to be used for carrying of a machine tool or a semiconductor manufacturing apparatus, and an armature as a mover move relative to each other, there is a motor as shown in FIG. 9. FIG. 9 is a front sectional view of a conventional linear mobile motor. Here, an example of a moving-coil-type linear mobile motor that uses an armature as a mover will be described. Reference numeral 252 denotes a stator, reference numeral 255 denotes a mover, reference numeral 250 denotes a plate field yoke, and reference numeral 251 denotes a plurality of permanent magnets with different magnetic poles arranged alternately along the filed yoke 250 (vertical to the paper). A field pole composed of the field yoke 250 and the permanent magnets 251 constitutes the stator 252. Reference numeral 255 denotes a mover having a frame 254 provided with a number of coils 253 that are provided opposite to the permanent magnets 251 via a magnetic gap. The coils 253 are anchored with resin molding (not shown), and the frame 254 and the coils 253 constitute the armature. Further, the frame 254 can be a frame for fixing a transporting member for carrying a load or may be a transporting member itself. Pipes 260 and 256 are arranged at the bottom and sides of the field yoke 250. The pipes 260 and 256 are connected to an air blower (not shown) such that air flows through the pipe. A vent hole 257 for allowing a gap between the mover 255 and the stator 252 and the pipe 260 to communicate with each other is empty in the field yoke 250 such that the air flow through the pipes flows into the gap. Vent holes 258 for allowing a gap between the mover 255 and the stator 252 and the pipes 256 to communicate with each other are empty in the field yoke 250 and the permanent magnets 251 such that an air flowing through the pipes flows into the gap. By adopting such a configuration, in the linear mobile motor, a method of radiating the heat of a mover when a driving current continues to be supplied to the coils 253 from a power source in order to raise the thrust of the motor, and consequently temperature rises and calorific power increases due to an increase in the internal resistance of the coils 253 is disclosed (JP-A-2000-341911).

Meanwhile, in the aforementioned related art, the heat from the coils is radiated only by air blowing. Thus, when the motor is continuously driven long time, or when a high load is applied to the motor, heat cannot be radiated sufficiently, and consequently temperature rises and calorific power increase due to an increase in the internal resistance of the coils. Then, the heat is transferred via the frame to the transporting member fixed to the frame or to an upper part of the frame. As a result, the problem that thermal distortion of the frame and the transporting member is caused was not solved. In particular, in the portions of the frame facing the permanent magnets, the temperature of the coils rises with the lapse of time. Accordingly, the deflection caused by the thermal distortion that occurs in the longitudinal direction increases. Further, if the heat radiated from the coils of the linear or curved mobile motor increases, the distortion of the frame in the direction facing a row of the permanent magnets also increases, and consequently, the magnetic gap between the coils and the magnets fluctuates. As a result, since this deteriorates the traveling performance of the linear mobile motor, thereby causing an error in the degree of positioning accuracy, it was difficult to realize high-accuracy positioning. Further, since the magnetic gap fluctuates, it was also difficult to provide a motor that can make a curved movement having the fluctuation of the gap even if there is no thermal distortion.

The present invention has been made to solve the aforementioned problems. It is therefore an object of the invention to provide a radiator for a linear or curved mobile motor capable of removing the thermal distortion of a mover or a transporting member, and a high-accuracy, hi-reliability linear or curved mobile motor using the radiator.

DISCLOSURE OF THE INVENTION

In order to solve the above problems, according to a first aspect of the present invention, there is provided a radiator used for a linear or curved mobile motor which includes a field pole having a plurality of permanent magnets with different magnetic poles arranged alternately along a field yoke, and an armature arranged opposite to the field pole via a magnetic gap and formed by winding a single or a plurality of coils around a core. The field pole is used as a stator and the armature is used as a mover that is moved relatively along a longitudinal direction of the stator. The radiator includes a heat absorbing unit constituted by a thin plate heat pipe having therein thin holes for allowing a hydraulic or working fluid to pass therethrough is in close contact with the coil surface of the mover and a heat radiating unit constituted by an end or part of the thin plate heat pipe is allowed to project from the magnetic gap. A linear motor may be configured by arranging permanent magnets and coils in parallel to each other in a planar shape, and by arranging the permanent magnets and the coils so as to face each other via a gap, and a linear motor may be configured by arranging permanent magnets in a columnar (cylindrical) shape, and by concentrically winding coils around cylindrical columnar permanent magnets via a gap. On the contrary, a linear motor may be configured by concentrically arranging cylindrical permanent magnets so that they may cover the periphery of coils wound in a columnar (cylindrical) shape via the gap. If a core part of a frame wound by coils of an armature is formed as a non-magnetic body or a cavity, an attraction force does not act between a magnetic pole and a core. Thus, any contact caused by the action of a lateral force between a stator and a mover can also be suppressed. Further, if the core is formed as a cavity, wiring lines can be passed into through the cavity, and therefore a space for allowing the wiring lines to be disposed therein can be made unnecessary. Moreover, the permanent magnets of the stator may be formed from coils. Further, the thin plate heat pipe allowed to project from the linear or curved mobile motor is allowed to project in a direction vertical to a traveling direction of the mover, so that the degree of freedom of a space that constitutes a heat radiating unit can be increased as compared with a case where the plate heat pipe is allowed to project in the traveling direction. Further, as compared with a case where a heat radiating unit is allowed to project back and forth, the heat transfer distance from the heat generating coil to the heat radiating unit can be shortened. Thus, the quantity of heat that escapes while heat is transferred to the heat radiating unit can be reduced. Generally, the area of a surface of a coil part of a mover extending along the traveling direction is larger than the area of a surface thereof vertical to the traveling direction. Thus, it is optimal for raising the heat radiation efficiency of the radiator of the linear or curved mobile motor that a side surface having the larger area is used as a heat absorbing unit, heat is transferred in a radial direction with respect to an axis having the shortest distance from the heat absorbing unit by a plate heat pipe, and a heat radiating unit is configured in the radial direction with respect to the axis.

According to the first aspect of the present invention, the thin plate heat pipe is brought into close contact with the surface of the mover facing a row of the permanent magnets as the stator, and a heating receiving unit of the plate heat pipe is brought into close contact with the surface of the mover, and the heat radiating unit is allowed to project from the gap between the stator and the mover. Thus, for example, when the mover is caused to move with high thrust, the heat generated in the mover coils can efficiently radiated by the plate heat pipe with a simple structure.

According to a second aspect of the present invention, there is provided a linear or curved mobile motor including a field pole having a plurality of permanent magnets with different magnetic poles arranged alternately along a field yoke, and an armature arranged opposite to the field pole via a magnetic gap and formed by winding a single or a plurality of coils around a core. The field pole is used as a stator and the armature is used as a mover that is moved relatively along a longitudinal direction of the stator. A thin plate heat pipe having therein thin holes for allowing a hydraulic or working fluid to pass therethrough is in close contact with the coil surface of the mover to constitute a heat absorbing unit and an end or part of the thin plate heat pipe is allowed to project from the magnetic gap to constitute a heat radiating unit. A linear motor may be configured by arranging coils of a field pole and coils of an armature in a planar shape, and by arranging the field pole and the armature opposite to a gap, and a linear motor may be configured by arranging coils of a field pole in a cylindrical shape, by concentrically winding coils of an armature around the cylindrical columnar field pole in a cylindrical shape, and by concentrically arranging the field pole and the armature via the gap. On the contrary, a linear motor may be configured by concentrically arranging coils of a field pole so that they may concentrically cover the periphery of coils of an armature wound in a columnar (cylindrical) shape, and by concentrically arranging the field pole and the armature via a gap. If a core part of a frame wound by coils of an armature is formed as a nonmagnetic body or a cavity, an attraction force does not act between a magnetic pole and a core. Thus, any contact between a stator and a mover can also be suppressed. Further, if the core is formed as a cavity, wiring lines can be passed into through the cavity, and therefore a space for allowing the wiring lines to be disposed therein can be made unnecessary. If a radiator is integrally assembled into a linear or curved mobile motor and is fixed with resin molding, assembling into an apparatus can also be performed easily. Moreover, if a radiator is disposed in a dead space of an apparatus, the linear or curved mobile motor can be disposed without making the apparatus large.

According to the second aspect of the present invention, when the linear or curved mobile motor is configured, it is possible to suppress fluctuation of the magnetic gap between the coils and the permanent magnets caused by thermal deformation, and to suppress distortion of the mover or stator caused by thermal expansion. As a result, it is possible to provide a linear or curved mobile motor allowing high-accuracy positioning.

According to a third aspect of the present invention, the heat radiating unit of the thin plate heat pipe is provided with a heat radiating means. Although fans, fins with a fan, or heat sinks can be used as the heat radiating means, it is preferable to use the fans or heat sinks that do not require power. Since movement of the mover forces air to flow into the fins or heat sinks, sufficient heat radiation efficiency can be obtained only by the fins or heat sinks. Further, if the surfaces of the fins or heat sinks facing the traveling direction of the mover are made large, and a structure that facilitates flow of air is adopted, the heat radiation efficiency increases. For example, when plate fins or heat sinks are used, it is desirable that the fins or heat sinks are so as to incline with respect to the traveling direction.

According to the third aspect of the present invention, fins or heat sinks are directly brought into close contact with the heat radiating unit that moves together with the mover, so that air always flows to the heat radiating unit. As a result, heat radiation efficiency can be improved. Moreover, fans are combined together, so that heat radiation efficiency can be improved considerably.

According to a fourth embodiment of the present invention, the mover is provided with a transporting member for allowing a load to be mounted thereon with an insulating plate heat pipe therebetween. As an insulating means, a plate heat pipe may be covered with an insulating material, or if there is any space, a transporting member and a plate heat pipe may be arranged so as not to contact each other.

According to the fourth embodiment of the present invention, since the heat generated in the coils of the mover can be kept from being transferred to the transporting device, distortion of the transporting member can be suppressed. For example, when precision components are carried and disposed by a robot, it is possible to provide a linear or curved mobile motor capable of being positioned with high precision and stably for long time without being affected by the heat generation of the coils.

According to a fifth embodiment of the present invention, the plate heat pipe has therein a thin hole structure with a meandering hollow path. Arbitrary shapes, such as a round shape and a rectangular shape, may be as the sectional shape of the thin holes so long as a hydraulic or working fluid completely blocks the inside of the pipe by its surface tension.

According to the fifth embodiment of the present invention, since the plate heat pipe has therein a thin hole structure with a meandering hollow path, heat transfer efficiency can be made extremely high with a small structure, and heat can be moved fast. Further, since the radiator can operate even in a top heat mode without being almost affected by the posture of the plate heat pipe, the radiator can be disposed without paying attention to the positional relationship between the heat absorbing unit and the heat radiating unit.

According to a sixth embodiment of the present invention, the plate heat pipe is integrally anchored to the surface of the mover by resin molding. As materials used for the resin molding, any materials may be used so long as they electrically insulate the coils heat pipe from each other, and have good thermal conductivity. Further, if the heat absorbing unit that touches the coils of the plate heat pipe is formed from an insulating material or is brought into close contact with the coils via an insulating material, or the coils are subjected to insulating film processing, the coils and the plate heat pipe can be resin-molded while they are brought into close contact with each other.

According to the sixth embodiment of the present invention, since the plate heat pipe is integrally anchored to the surface of the mover by resin molding, the plate heat pipe can be easily to the surface of the mover. Moreover, since a rise in the temperature of the coils can be suppressed, any breakage caused by the thermal distortion of the resin molding that covers the coils can also be prevented. Therefore, for example, even when the linear or curved mobile motor is used in a vacuum environment, generation of outgas from the surface of a broken part of the resin molding can be prevented. As a result, it is possible to provide a high-reliability linear or curved mobile motor.

According to a seventh embodiment of the present invention, a thin plate heat pipe having therein thin holes for allowing a hydraulic or working fluid to pass therethrough is in close contact with the coil surface of the mover in parallel to a surface facing via a magnetic gap to constitute a heat absorbing unit and an end or part of the thin plate heat pipe is allowed to project from the magnetic gap to constitute a heat radiating unit. When the plate heat pipe is fabricated of aluminum that is a nonmagnetic substance, its thickness can be set to 1 mm or more, and heat can be radiated without substantially disturbing a magnetic field within in the magnetic gap between the permanent magnets and the coils. Moreover, if there is no weight problem, the plate pipe can also be made of a material, such as stainless steel or Tefron (Registered Trademark). Further, if there in no problem in strength, the plate heat pipe can be made of a material, such as plastic.

According to the seventh aspect of the present invention, it is possible to transfer the heat from the coils of the linear or curved mobile motor using the magnetic gap between the coils and the permanent magnets without performing particular machining.

Further, the above aspect of the present invention, since the plate heat pipe that is brought into close contact with the coils is disposed in the gap between the mover and the stator, the plate heat pipe is easily extended to a place where there is any space for allowing a heat radiating means to be disposed therein. In this space, the heat radiating means can be mounted on the heat pipe. Thus, the heat generated in the coil part can be radiated more efficiently, and it is not necessary to forcedly leave the space for allowing the heating radiating unit to be disposed therein. As a result, the linear or curved mobile motor can made small.

Moreover, since the heat of the mover unit generated when the mover is caused to move with high thrust can be removed efficiently by the plate heat pipe, it is possible to suppress fluctuation of the magnetic gap between the coils and the permanent magnets caused by thermal deformation, and to suppress distortion of the mover or stator caused by thermal expansion. As a result, it is possible to provide a linear or curved mobile motor allowing high-accuracy positioning.

BEST MODE FOR CARRYING OUT THE INVENTION

Figure 1:
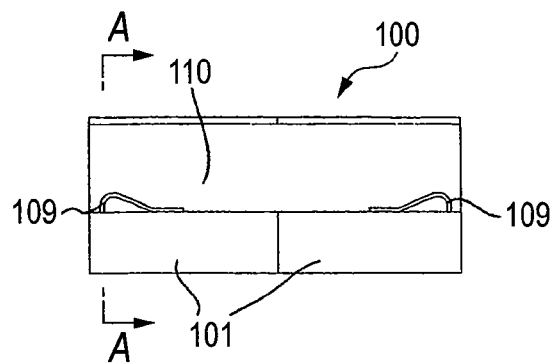
FIG. 1 is a side view of a radiator according to the present invention.
Figure 2:
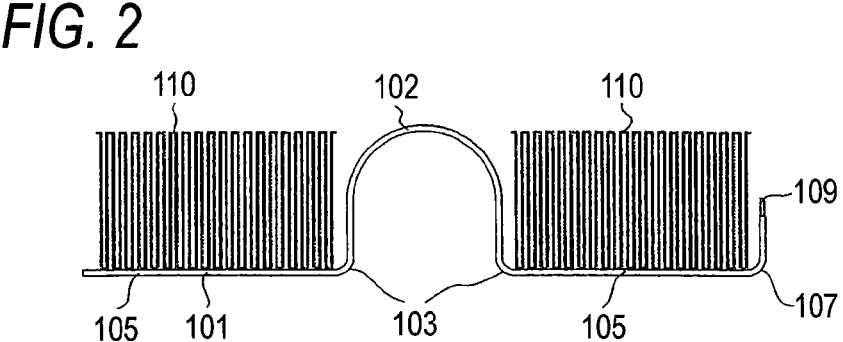
FIG. 2 shows the radiator as seen in the direction of an arrow A-A of FIG. 1.

FIGS. 1 and 2 show a radiator according to the present invention. FIG. 1 is a side view of the radiator. FIG. 2 is a view (sectional view) as seen in the direction of an arrow A-A of FIG. 1. Reference numeral 101 denotes plate heat pipes (plate thin hole tunnel heat pipes). In the present embodiment, two plate heat pipes are used side by side. In order to bring each of the plate heat pipes 101 into close contact with a coil of a mover of a motor in the vicinity of the center of the radiator, the heat pipe is bent in conformity with the shape of the mover. In the present embodiment, in order to bring the plate heat pipe 101 into close contact with a semicircular part of the coil wound around in a columnar shape, a central part 102 of the heat pipe 101 is bent in a semicircular shape. The part that is bent in a semicircular shape becomes a heat absorbing unit that absorbs the heat generated from the coil.

The plate heat pipe 101 extending from the heat absorbing unit is bent at right angles at a bent part 103, and extends in a radial direction with respect to the heat absorbing unit to form a heat radiating unit 105. One end of the plate heat pipe 101 has a part 107 that is further bent at right angles. This part is provided to protect a pouring pipe 109 that pours a hydraulic or working fluid into the plate heat pipe 101. Radiating fins 110 are mounted by means of welding, brazing, etc. parallel to the part 102 of the heat radiating unit 105 that is bent in a semicircular shape. Although the fins are used herein, heat sinks, fans, or combinations thereof may be mounted.

As described above, when the plate heat pipe 101 is used, the pipe can be bent freely. Thus, without being restricted by the shape of a motor or a heat radiating unit, it is not necessary to newly provide a space for heat radiation in an apparatus using the motor, and it is possible to provide the heat radiating unit in a space with no use. For example, when the motor is used for a driving unit of a transporting device of a machine tool or a semiconductor manufacturing apparatus, a cavity is provided below a carrier. If this cavity is formed with the heat radiating unit, a new heat radiating space is formed to prevent occurrence of a problem that an apparatus is made large. Thus, it is possible to prevent the apparatus from being made large uselessly.

Here, the structure of the plate thin hole tunnel heat pipe 101 will be described with reference to FIGS. 3 to 4.

Figure 3:
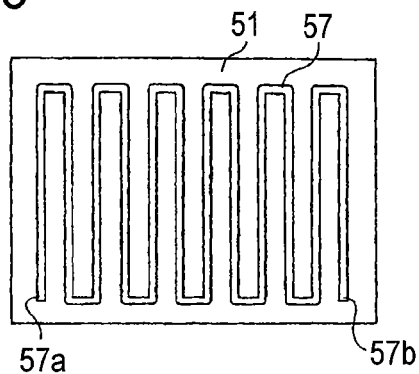
FIG. 3 is a path diagram of a plate meandering thin hole tunnel heat pipe of the present invention.

FIG. 3 shows a thin hole path 57 of a plate meandering thin hole tunnel heat pipe. A porous flat pipe made of a material, such as aluminum or magnesium is used as the plate meandering thin hole tunnel heat pipe. The porous flat pipe 51 has a flat plate-like external shape as a whole, and a lager number of through thin holes 57a and 57b are formed in the flat pipe by extrusion molding. The meandering thin hole tunnels are formed by alternately cutting off partition wall between adjacent tunnels by a predetermined depth at one end of a group of through thin holes of the porous flat pipe 51 and by alternately cutting off partition walls between adjacent tunnels at the other end of the group, that are not cut off at the one end of the group. After removal of the partition walls at both the ends, a meandering thin hole tunnel heat pipe is formed together with a hydraulic or working fluid pouring pipe by crushing, welding or brazing. A plate meandering thin hole tunnel heat pipe is formed by pouring a hydraulic or working fluid according to use conditions, such as butane or water, into the meandering thin hole tunnel heat pipe from the hydraulic or working fluid pouring pipe, and then sealing the hydraulic or working fluid pouring pipe.

Figure 4:
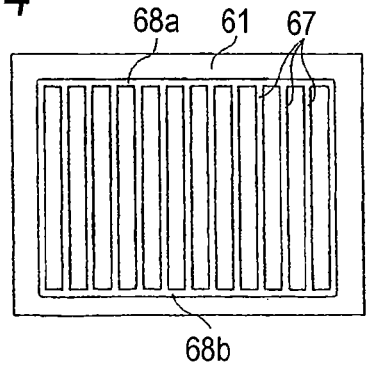
FIG. 4 is a path diagram of a plate parallel thin hole tunnel heat pipe of the present invention.

FIG. 4 shows a thin hole path 67 of a plate parallel thin hole tunnel heat pipe. A porous flat pipe made of light metal, such as aluminum or magnesium, similarly to the plate meandering thin hole tunnel heat pipe, is used as the plate parallel thin hole tunnel heat pipe. The porous flat pipe 61 has a flat plate-like external shape as a whole, and a large number of through thin holes 68a and 68b that are arranged parallel to one another are formed in the porous flat pipe by extrusion molding. Communicating passages between adjacent tunnels of a group of the parallel thin hole tunnels are formed by cutting off all the adjacent partition walls of the group of through thin hole tunnels by a predetermined depth at both ends of the group. After removal of the partition walls at both the ends, a parallel thin hole tunnel heat pipe is formed together with a hydraulic or working fluid pouring pipe by crushing, welding or brazing. A plate parallel thin hole tunnel heat pipe is formed by pouring a hydraulic or working fluid according to use conditions, such as butane or water, into the meandering thin hole tunnel heat pipe from the hydraulic or working fluid pouring pipe, and then sealing the hydraulic or working fluid pouring pipe.

Although the meandering thin holes and the parallel thin holes have been described herein, the communicating passages at the ends may be formed by arbitrary methods if all the thin hole tunnels can communicate with one another at the ends.

Here, the principle of the operation of the thin hole tunnel heat pipe according to the present invention will be described.

In the thin hole tunnel heat pipe, both terminals of a thin hole (a heat medium passage) are connected and hermetically sealed so that it can pass a hydraulic or working fluid. When a heating element is brought into contact with a certain part of the thin hole, an external part becomes a heat receiving unit, another part becomes a heat radiating unit, and the other part become a heat carrying unit. In this manner, the heat receiving unit and the heat radiating unit are arranged alternately (If there is a heat carrying unit, the heat receiving unit and the heat radiating unit are arranged alternately via the heat carrying unit). The internal wall section of the thin hole has a smaller diameter than such a maximum fluid diameter that a hydraulic or working fluid (a liquid and gaseous two-phase condensing hydraulic or working fluid) can circulate or move in a state where it always occludes the interior of the pipe by surface tension. In the heat receiving unit, nucleate boiling of a liquid is caused to generate a gas, whereby the liquid part that has occluded the interior of the pipe moves. As the nucleate boiling is continuously caused in random places in the heat receiving unit, the liquid vibrates or move within the pipe, thereby transferring heat to the heat radiating unit.

By using such a thin pipe heat pipe, heat can be carried irrespective of the posture of attachment of the thin pipe heat pipe to a heating element. By adopting the plate thin hole tunnel heat pipe as the basic principle of the operation, the present invention increases the capacity of heat radiation.

Figure 5:
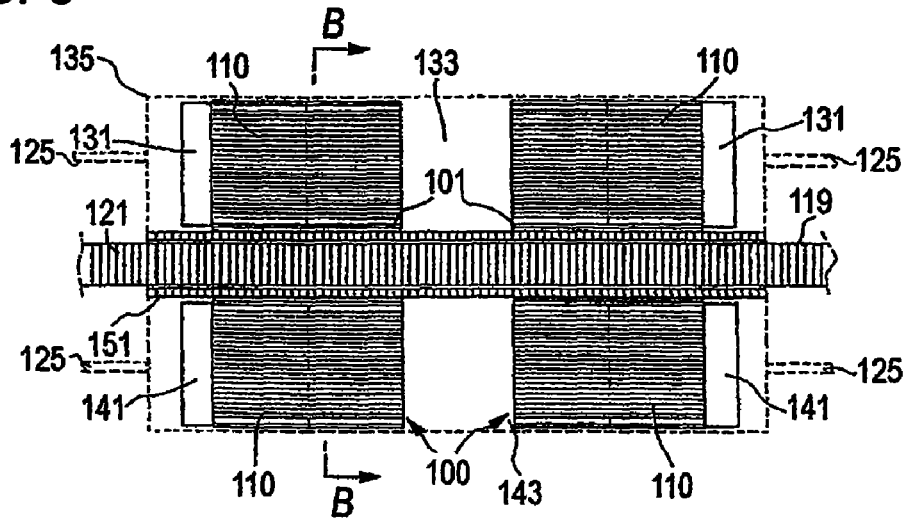
FIG. 5 is a sectional view of a first embodiment in which a linear or curved mobile motor according to the present invention is used for a transporting device using the two radiators of FIG. 1.
Figure 6:
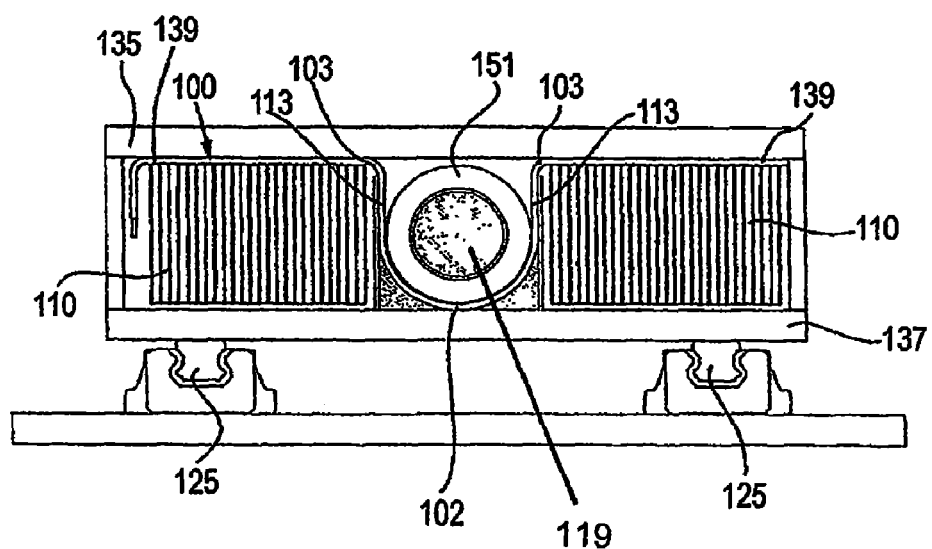
FIG. 6 is a view as seen in the direction of an arrow B-B of FIG. 5.

FIGS. 5 and 6 show a first embodiment of a transporting device to which a linear or curved mobile motor having the radiator of the present invention mounted thereon is applied.

FIG. 5 is a plan sectional view of a linear or curved mobile motor when two such radiators of FIGS. 1 and 2 are mounted on the linear or curved mobile motor. FIG. 6 is a view (sectional view) of the linear or curved mobile motor as seen in the direction of an arrow B-B of FIG. 5.

In FIGS. 5 and 6, reference numeral 100 denotes the radiator of the present invention. The radiator 100 is mounted such that the part 102 that is bent in a circular-arc shape of a semicircle of the central part is brought into close contact with a half surface of a cylindrical coil of a mover 151 as shown in FIG. 5. By winding a copper wire in the shape of at least one cylinder, the coil of the mover 151 forms an armature. Moreover, extending parts of both the ends of the circular-arc part 102 of the semicircle of the plate thin hole tunnel heat pipe that constitutes the radiator are bent at 90 degrees at ends 103 of straight parts 113 having almost the same length as the radius of the cylindrical coil so that the heat generated from the cylindrical coil in the radial direction with respect to the axial direction of the cylindrical coil can be diffused by the plate thin hole tunnel heat pipe.

Fixation of the cylindrical coil and the plate thin hole tunnel heat pipe 101 is made by bonding them with an adhesive for metal having good thermal conductivity and high insulating properties. Further, in order to increase the fixing strength, the fixation may be reinforced using a fixing member (not shown).

Inside the mover 151 using the cylindrical coil as an armature, permanent magnets 121 are arranged concentrically with the mover 151 such that they become an N pole and an S pole alternately, thereby constituting a stator 119. The mover 151 moves along the stator, thereby constituting a motor.

The radiating fins 110 having almost the same length as the diameter of the cylinder coil are anchored to whole horizontal parts 139, each of which become the heat radiating unit of the plate thin hole tunnel heat pipe 101, parallel to the cylindrical coil by means of soldering, brazing, etc. Ends of the horizontal parts 101 of the plate thin hole tunnel heat pipe 101 extend to portions that do not stick out of a carrier 135 fixed to the linear or curved mobile motor (reference numeral 135 of FIG. 5 denotes a carrier, and the horizontal parts do not stick out of the carrier).

By adopting such configuration, the heat absorbed from the cylindrical coil by the plate thin hole tunnel heat pipe 101 is carried in the radial direction with respect to the central axis of the cylindrical coil, and is radiated by the fins 110 mounted on the plate thin hole tunnel heat pipe 101. Thereby, heat can be efficiently radiated from the cylindrical coil of the linear or curved mobile motor by the small-sized radiator 100. Thus, it is possible to miniaturize the linear or curved mobile motor, and it is possible to increase a current flowing through the cylindrical coil to increase a driving torque. Corrugated fins are mounted as the above fins.

Further, the fins that constitute the heat radiating unit can be arranged in a space between the carrier 135 and a bottom base 137, which has conventionally been a dead space, and the semicircular part 102 of the plate thin hole tunnel heat pipe 101 that becomes the heat absorbing unit can also be arranged between the mover 151 and the carrier 135. Thus, it is possible to arrange the radiator 100 so that an apparatus may not be made large.

Guides 125 are mounted on the bottom plate 137 so that a table may move stably during linear or curved movement.

Moreover, fans 131 (141) are mounted as shown in FIG. 5 such that winds are blown towards the spaces 133 (143) from the fans 131 (141) at both ends and such that the winds from the fans 131 (141) at both ends collide with each other in the spaces 133 (143) and are extracted to the outside from the spaces 133 (143). Thereby, heat radiation efficiency can be enhanced. By reversing the direction of the winds of both the fans 131 (141), air may be sucked from the spaces 133 (143). Further, the fans 131 (141) at both ends can also be configured such that the wind flows in the same direction as the traveling direction of the mover. In this case, since heat is radiated by flow of the upstream heated air to the downstream fans, heat radiation efficiency is lowered depending on how to use the fans. That is, if the fans 131 (141) at both ends are rotated in the directions opposite to each other, the air heated by one fan can be prevented from being blown against the other fan, and consequently the cooling efficiency increases.

Figure 7:
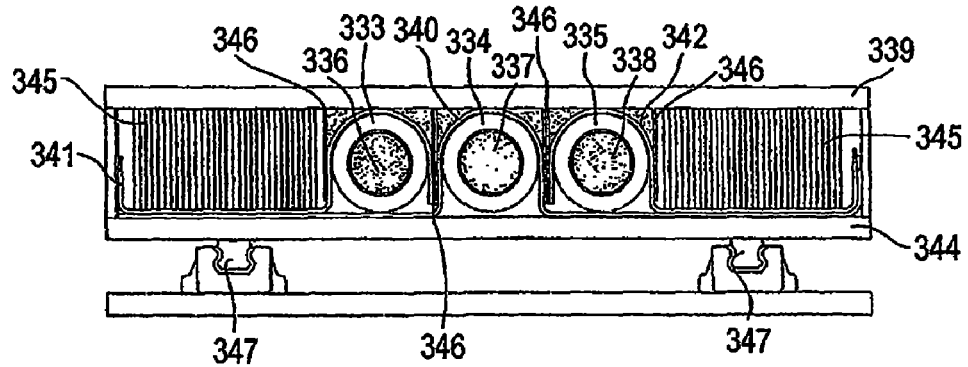
FIG. 7 is a sectional view of a second embodiment in which a linear or curved mobile motor according to the present invention is used for a transporting device.

Referring to FIG. 7, three sets of movers and stators are arranged in a motor unit that constitutes a driving unit. Each of the three sets consists of a mover 333 (334 or 335) that has an armature built therein by winding a coil in a cylindrical shape and a stator 336 (337 or 338) that is arranged inside the mover 333 (334 or 335) concentrically with the mover 333 (334 or 335) such that permanent magnets become an N pole and an S pole alternately. By arranging a plurality of sets of movers and drivers in this manner, a large driving force can be obtained, and by arranging them adjacent to each other, a carrier 339 can be kept from being twisted and deviated due to variations in the controllability of each set of mover and driver. In the central mover 334, a plate thin hole tunnel heat pipe 340 for carrying the heat generated by a coil to the heat radiating units arranged in the spaces at both ends of the transporting device is arranged such that a central part thereof is bent in a semicircular shape so as to come into close contact with the coil of the mover 334, like Embodiment 1, and is configured such that both ends thereof extend to the heat radiating units along a bottom base 344. In the movers 333 and 335 at both ends, each of plate thin hole tunnel heat pipes 341 and 342 for carrying the heat generated by coils to the heat radiating units is arranged such that one end thereof is bent in a semicircular shape so as to come into close contact with an upper half of a coil of each mover, and such that the other end thereof extends towards each heat radiating unit along the bottom base 344, and is brought into close contact with the plate thin hole tunnel heat pipe 340 so that heat may be transferred to the heat radiating unit of the plate thin hole tunnel heat pipe 340. Fins 345 are arranged in close contact with the heat radiating unit of the plate thin hole tunnel heat pipe 340 such that they do not stick out of the space between the carrier 339 and the bottom base 344 that has conventionally been a dead space, thereby forming a heat radiating unit. In the present embodiment, the heat radiating units at both ends of the plate thin hole tunnel heat pipe 340 and the plate thin hole tunnel heat pipe 341 are brought into close contact with each other, and the heat radiating units at both ends of the plate thin hole tunnel heat pipe 340 and the plate thin hole tunnel heat pipe 342 are brought into close contact with each other. However, one heat radiating unit may be arranged along the bottom base, the other heat radiating unit may be arranged along the carrier, and fins may be fixedly arranged between both the plate thin hole tunnel heat pipes.

Fixation of the cylindrical coils of the movers 333 (334 and 335) and the plate thin hole tunnel heat pipes 340, 341, and 342 are made by bonding them with an adhesive for metal having good thermal conductivity and high insulating properties. Further, in order to increase the fixing strength, the fixation may be reinforced using a fixing member (not shown). Further, in the parts of the plate thin hole tunnel heat pipes 341 (340 and 342) that are brought into close contact with the movers 333 (334 and 335), members 346 that absorb the vibration of the parts of the plate thin hole tunnel heat pipes 341 (340 and 342) that are brought into close contact with the movers 333 (334 and 335) and fixes them are fixed to the carrier 339.

Guides 347 are mounted on the bottom base 344 so that a table may move stably during linear or curved movement.

Further, even in a case where the movers 333 (334 and 335) are arranged at the peripheries of the stators like the present application, the radiator of the present invention makes it possible to arrange the plate thin hole tunnel heat pipes 341 (340 and 342) in close contact with the coils even in slight spaces between the carrier 339 and the movers 333 (334 and 335). Thus, extra manufacturing costs are not needed without necessitating providing new spaces for allowing heat radiating units to be disposed therein.

Figure 8:
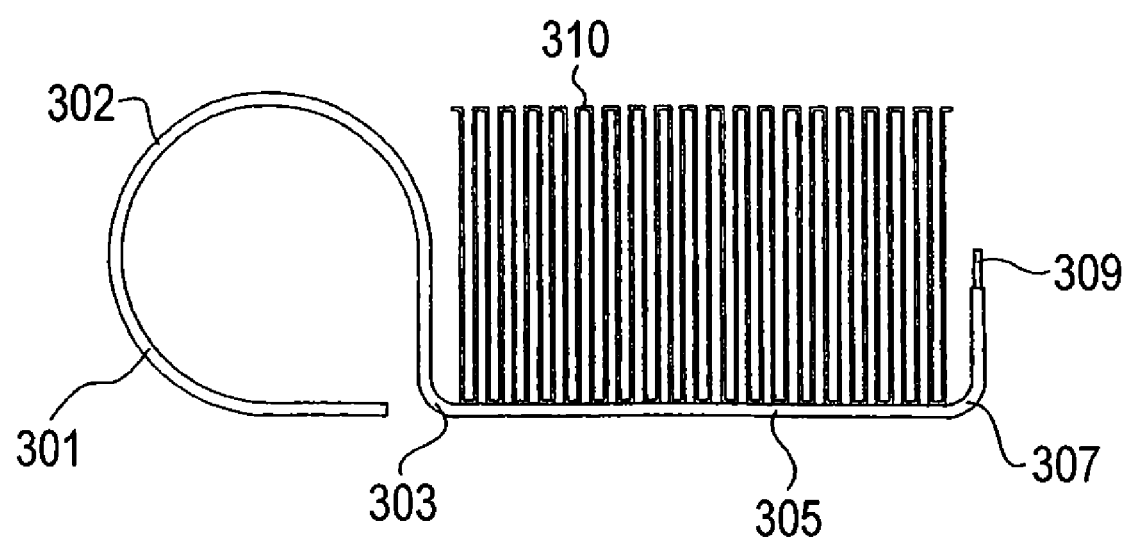
FIG. 8 is a sectional view of the second embodiment of the radiator according to the present invention.
Figure 9:
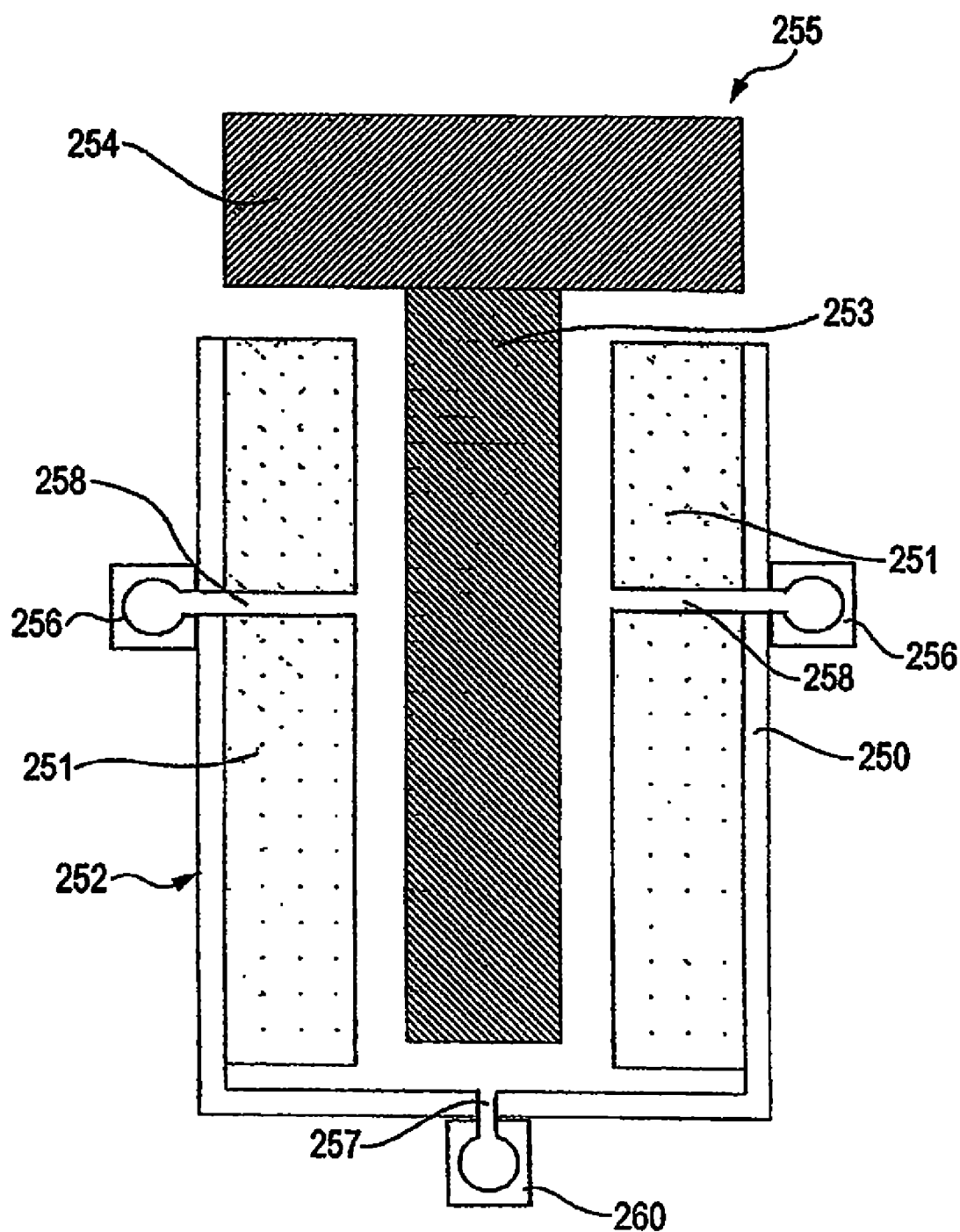
FIG. 9 is a sectional view of a conventional linear mobile motor.

FIG. 8 is a sectional view of a second embodiment of the radiator according to the present invention. Reference numeral 301 denotes a plate heat pipe (plate thin hole tunnel heat pipe). The plate heat pipe 301 is bent in conformity with the shape of a mover of a motor so that its one end may be brought into close contact with a coil of the mover. In the case of the present embodiment, one end 302 of the plate heat pipe 301 is bent in a circular shape so as to come into close contact with a cylindrical part of a coil wound in a cylindrical shape. The part that is bent in a circular shape becomes a heat absorbing unit that absorbs the heat generated from the coil.

The plate heat pipe 301 that extends from the heat absorbing unit is bent at right angles at a bent part 303, and extends in the radial direction with respect to the heat absorbing unit, thereby forming a heat radiating unit 305. The other end of the plate heat pipe 301 has a part 307 that is further bent at right angles. This part is provided to protect a pouring pipe 309 that pours a hydraulic or working fluid into the plate heat pipe 301. Radiating fins 310 are mounted by means of welding, brazing, etc. parallel to the part 302 of the heat radiating unit 305 that is bent in a semicircular shape. Although the fins are used herein, heat sinks, fans, or combinations thereof may be mounted.

As described above, one end of the heat pipe is used as a heat absorbing unit and the other end of the heat pipe is used as a heat radiating unit, so that the heat absorbing unit can be made large, and consequently heat can be absorbed efficiently. Further, this is effective even in a case where a heat radiating space is provided only on one side of a heat source. Further, this may be used in an embodiment in which the linear or curved mobile motor of the present invention is applied to a carrier.

INDUSTRIAL APPLICABILITY

The present invention relates to a linear or curved mobile motor that is adapted such that a field pole as a stator to be used for carrying of a machine tool or a semiconductor manufacturing apparatus and an armature as a mover move relative to each other, and its heat radiating structure of the mover.

The invention claimed is:

1. A radiator used for a linear mobile motor comprising a field pole having a plurality of permanent magnets with different magnetic poles arranged alternately along a field yoke, and an armature arranged opposite to the field pole via a magnetic gap and formed by winding a single or a plurality of coils around a core, the field pole being used as a stator and the armature being used as a mover that is moved along a longitudinal direction of the stator, the radiator comprising:

a heat absorbing unit constituted by a first portion of a thin plate heat pipe having therein thin holes containing working fluid for allowing the working fluid to move therethrough, wherein the thin plate heat pipe is bent in conformity with a shape of the coil or coils such that the heat absorbing unit is in close contact with a surface of the coil or coils, and the radiator further comprising a heat radiating unit constituted by a second portion of the thin plate heat pipe, the heat radiating unit projecting away from the magnetic gap, the thin plate heat pipe having closed first and second ends such that the working fluid is retained within the thin plate heat pipe, wherein the thin plate heat pipe has a flat plate-like frame having a thickness less than a width and a length, and having at least one conduit positioned within the frame to retain the working fluid, and wherein the thin plate heat pipe is fixedly connected to the armature such that the thin plate heat pipe, including the heat absorbing unit and the heat radiating unit, is configured to move with the armature.

2. A linear mobile motor comprising:

a field pole having a plurality of permanent magnets with different magnetic poles arranged alternately along a field yoke, and an armature arranged opposite to the field pole via a magnetic gap and formed by winding a single or a plurality of coils around a core, the field pole being used as a stator and the armature being used as a mover that is moved along a longitudinal direction of the stator, the linear mobile motor further comprising a thin plate heat pipe having therein thin holes containing working fluid for allowing the working fluid to move therethrough, wherein a first portion of the thin plate heat pipe is bent in conformity with a shape of the coil or coils to be in close contact with a surface of the coil or coils of the armature and constitutes a heat absorbing unit and a second portion of the thin plate heat pipe projects away from the magnetic gap and constitutes a heat radiating unit, the thin plate heat pipe having closed first and second ends such that the working fluid is retained within the thin plate heat pipe, wherein the thin plate heat pipe has a flat plate-like frame having a thickness less than a width and a length, and having at least one conduit positioned within the frame to retain the working fluid, and wherein the thin plate heat pipe is fixedly connected to the armature such that the thin plate heat pipe, including the heat absorbing unit and the heat radiating unit, is configured to move with the armature.

3. The radiator for a linear mobile motor according to claim 1, wherein the heat radiating unit is provided with a heat radiating means.

4. The radiator for a linear mobile motor according to claim 1, wherein the mover is provided with a transporting member for allowing a load to be mounted thereon and wherein a portion of the thin plate heat pipe is positioned between the mover and the transporting member.

5. The radiator for a linear mobile motor according to claim 1, wherein the thin plate heat pipe has therein a thin hole structure with a meandering hollow path.

6. The radiator for a linear mobile motor according to claim 1, wherein the thin plate heat pipe is integrally anchored to a surface of the mover by resin molding.

7. The linear mobile motor according to claim 2, wherein the heat radiating unit comprises a heat radiating means.

8. The linear mobile motor according to claim 2, wherein the mover is provided with a transporting member for allowing a load to be mounted thereon, and wherein the thin plate heat pipe is positioned between the mover and the transporting member.

9. The linear mobile motor according to claim 2, wherein the thin plate heat pipe has therein a thin hole structure with a meandering hollow path.

10. The linear mobile motor according to claim 2, wherein the thin plate heat pipe is integrally anchored to a surface of the mover by resin molding.

11. The radiator according to claim 1, wherein the coil or coils are bent to define an annular shape around the stator.

12. The linear mobile motor according to claim 2, wherein the coil or coils are bent to define an annular shape around the stator.

13. The radiator according to claim 1, wherein the heat radiating unit is constituted by the second portion of the thin plate heat pipe and a third portion of the thin plate heat pipe, and the heat radiating unit comprises first and second radiating fin assemblies positioned on the second and third portions of the thin plate heat pipe, respectively, and wherein the second and third portions of the thin plate heat pipe are spaced from one another to be on opposite sides of the first portion.

14. The linear mobile motor according to claim 2, wherein the heat radiating unit is constituted by the second portion of the thin plate heat pipe and a third portion of the thin plate heat pipe, and the heat radiating unit comprises first and second radiating fin assemblies positioned on the second and third portions of the thin plate heat pipe, respectively, and wherein the second and third portions of the thin plate heat pipe are spaced from one another to be on opposite sides of the first portion.

15. The radiator according to claim 11, wherein the heat radiating unit is constituted by the second portion of the thin plate heat pipe and a third portion of the thin plate heat pipe, and the heat radiating unit comprises first and second radiating fin assemblies positioned on the second and third portions of the thin plate heat pipe, respectively, and wherein the second and third portions of the thin plate heat pipe are spaced from one another to be on opposite sides of the first portion.

16. The linear mobile motor according to claim 12, wherein the heat radiating unit is constituted by the second portion of the thin plate heat pipe and a third portion of the thin plate heat pipe, and the heat radiating unit comprises first and second radiating fin assemblies positioned on the second and third portions of the thin plate heat pipe, respectively, and wherein the second and third portions of the thin plate heat pipe are spaced from one another to be on opposite sides of the first portion.

* * * * *